UNITED STATES PATENT OFFICE.

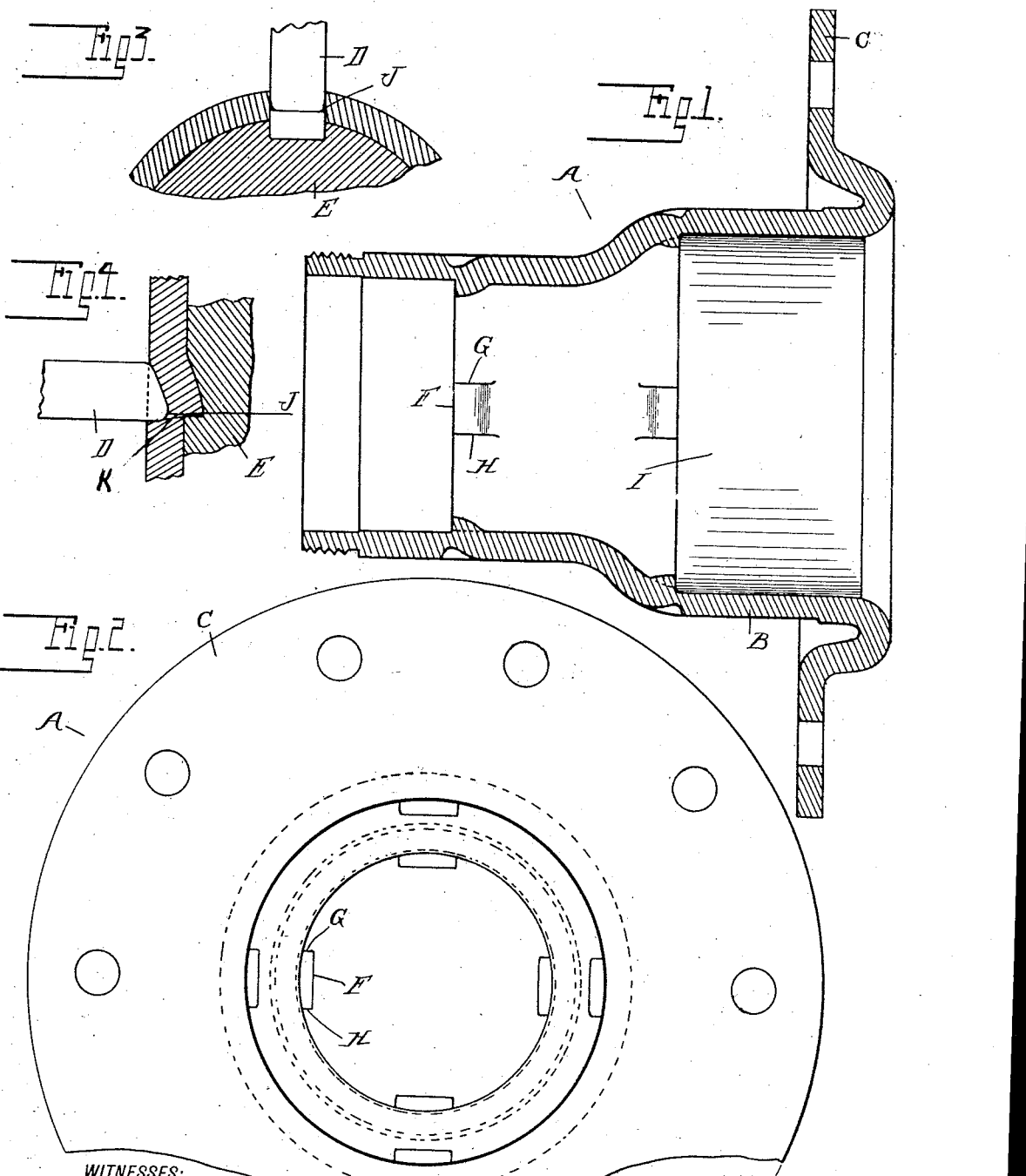

JOHN R. WINTER, OF LANSING, MICHIGAN, ASSIGNOR TO KELSEY WHEEL COMPANY, OF DETROIT, MICHIGAN, A CORPORATION OF MICHIGAN.

WHEEL-HUB AND METHOD OF FORMING THE SAME.

1,337,808.

Specification of Letters Patent. Patented Apr. 20, 1920.

Application filed August 31, 1914. Serial No. 859,571.

*To all whom it may concern:*

Be it known that I, JOHN R. WINTER, a citizen of the United States of America, residing at Lansing, in the county of Ingham and State of Michigan, have invented certain new and useful Improvements in Wheel-Hubs and Methods of Forming the Same, of which the following is a specification, reference being had therein to the accompanying drawings.

The invention relates to wheel hubs of that type having cylindrical portions formed from pressed sheet metal, and it is the primary object of the invention to form a shoulder for seating the race member of the axle bearing. Inasmuch as the structure is formed from sheet metal the gage is substantially uniform, and to form a square shoulder by a machining operation would require the cutting away of stock and the consequent weakening of the wall. On the other hand, if the shoulder were made by pressing in the cylindrical wall it would form a distortion which would also tend to weaken the structure. With my improvement I have avoided these difficulties by shearing a series of small sections to force the metal inward and to produce a square shoulder, and I have further so formed these shoulders as to avoid any openings in the wall through which the lubricating oil might escape.

In the drawings:

Figure 1 is an axial sectional view of the hub;

Fig. 2 is an end view of the hub;

Fig. 3 is a transverse section illustrating the manner of avoiding the perforation of the metal; and Fig. 4 is an elevation showing the lines in which the metal is sheared to form the shouldered bearings.

A is the wheel hub which, as shown, is provided with a cylindrical portion B and annular flange C at one end thereof. To form the shouldered bearing, sections in the periphery of the cylinder are forced inward by the operation of dies so as to produce an annular series of lugs against which the race member may be seated. These lugs cannot be formed by the mere bending or flowing of the metal without distorting the adjacent portions of the cylinder, and moreover by any bending process it is difficult or impossible to form square shoulders. I have therefore solved the difficulty by shearing the metal in the plane of the shoulder and also transversely thereof, so as to form tongues which may be deflected inward without change in the adjacent portions. As shown in Fig. 3, this shearing may be produced by a shearing die D and a cooperating recessed die member E. These dies will shear along the lines F, G, and H or upon three sides of the section, while the fourth side is merely bent. Thus the sheared seat F will form the square shoulder, against which the race member, such as I, may be seated.

As it is usual to pack the bearings within the hub with a lubricant, it is desirable that the walls of the cylinder should remain imperforate, as otherwise the lubricant would leak out. This I have accomplished by forming the die D with a rounded edge J, which will produce a fillet K in the metal of the hub and which will seal over the crevice formed by shearing. Furthermore, the deflection of the sheared metal is restricted to less than the depth of the gage so that there is no break made through which the fluid could pass.

What I claim as my invention is:—

1. The process of forming an abutment in a sheet metal lubricant holding member consisting in deflecting a tongue out of the wall of said member to a lesser degree than the gage of the metal and simultaneously squeezing the metal of said tongue laterally to form a sealed joint.

2. The process of forming an abutment in a sheet metal lubricant holding member consisting in forcing a portion of the wall of said member into a sharp-edged recess having an inclined bottom, the depth of said recess being less than the gage of said wall, and squeezing the metal thus deflected laterally to produce a sealed joint.

In testimony whereof I affix my signature in presence of two witnesses.

JOHN R. WINTER.

Witnesses:
PHYLLIS COBURN,
JAMES P. BARRY.